INVENTOR.
MARVIN SCOTT
BY Daniel P. Worth
ATTORNEY

INVENTOR.
MARVIN SCOTT
BY Daniel P. Worth
ATTORNEY

United States Patent Office 3,442,253
Patented May 6, 1969

3,442,253
SCREENING SYSTEM AND APPARATUS
Marvin Scott, Hamilton, Ohio, assignor to U.S. Plywood-Champion Papers Inc., Hamilton, Ohio, a corporation of New York
Filed Feb. 8, 1967, Ser. No. 614,742
Int. Cl. B05c 9/10, 11/10; B01f 3/12
U.S. Cl. 118—603                           11 Claims

ABSTRACT OF THE DISCLOSURE

A system and apparatus for screening lumps out of liquids has within a housing a tubular screening element that is moved in an hourglass-shaped orbit while the material being screened moves from the inlet into the housing, through the tubular screen, thence through a flexible outlet passage communicating with the inside of the tubular screening element.

---

This invention relates to a screening system and apparatus. While the invention is applicable to the screening or filtering of a wide range of materials, it has particular value in screening liquids, such as slurries, suspensions, and emulsions for coating paper, in connection with which it will be described.

In making a coated paper, a coating is applied to the surface of the paper and is dried. The coating commonly comprises water, mineral pigment (e.g., clay, calcium carbonate, titanium dioxide, aluminum hydrate, or a mixture), adhesive (e.g., casein, starch, latex, soya protein, polyvinyl alcohol, or a mixture), and often a dye, defoamer, emulsifier or surface active agent are added. Lumps appear in the coatings for a variety of reasons and cause defects in the coated paper. The defects are not only those of a poor appearance of the coated surface but also may include those causing a blemish when printed upon and holes in the paper due to a lump pushing its way through the paper. Sometimes the defects are of the "press-stopper" variety—that is, a printing machine is damaged or likely to be damaged by paper containing such a defect.

Timely detection of defects is difficult because the coating procedure is ordinarily performed continuously by applying coating continuously to a moving web of paper. Quite often the coating is done on a paper machine as part of the paper manufacturing procedure, or alternatively on a coating machine: in both such cases the coated paper is commonly wound up into a roll, which conceals the defects, and shipped to the printer. Thus, defects are not easily detected either by the paper manufacturer or his customer; the printer.

Various types of screens and filters have been used in coating preparation systems and coating application systems to remove lumps while the coating is being made and before the coating is applied to the paper, often in the past requiring a number of screens of large areas that require frequent clean-ups.

Also, coatings and liquid coating ingredients having a very high total solids have either been too difficult to screen or uneconomic to screen; even though the rheology indicates screening to be possible. A case in point is calcium carbonate slurries (calcium carbonate dispersed in water) having total solids of about 65% or higher where about 80% of the calcium carbonate particles are 2 microns or less; which have as a rule not been screened at all if that solids content is to be retained, or have been diluted by adding water, to render them more susceptible to screening. Dilution is not desirable.

One objective of the present invention is the provision of an improved apparatus for screening materials.

Other objectives of the present invention are the provisions of an improved system for screening materials.

Other objectives of this invention are to provide an improved apparatus and improved system suitable for screening paper coating materials at any of several points in the preparation or application to paper of a coating.

As a matter of convenience in describing the invention, I use the term "liquid" to refer to mixtures, solutions, slurries, suspensions, dispersions, emulsions, and the like—in short, those materials containing one or more liquids, containing a solid—advantageously aqueous liquids useful in coating paper.

Apparatus according to the invention comprises an elongated horizontally disposed tubular screening member; means supporting said screening member at a central portion thereof; means for moving one end of said screening member through a predetermined orbit eccentrically about the longitudinal axis thereof; a housing surrounding said screen; and having an outlet through the housing for fluids that have been screened; and conduit means connected between said outlet and the inside of said tubular screening member whereby materials may flow into said housing, through said screening member, thence out of said housing through said conduit.

Longer production runs, reduced down time, reduced coating loss from disposal of lumpy coatings; and reduced defects in the product are among the advantages realized from this invention when, for example, it is applied to treating paper coating materials.

Other objectives, advantages and features will become evident from the following description and drawings wherein.

Figure 1:
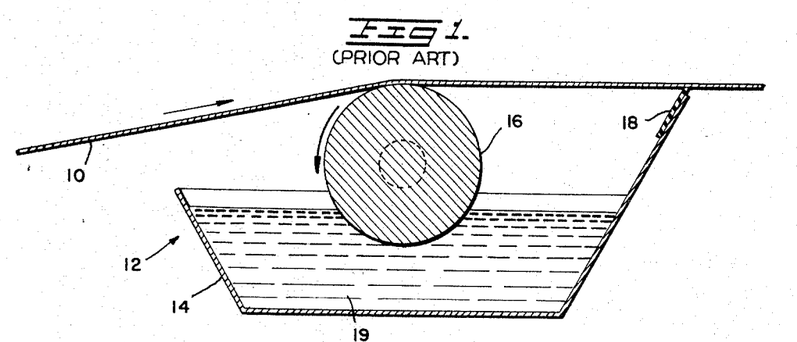
FIG. 1 schematically illustrates a typical prior art coating system.

FIG. 1 schematically represents a typical prior art coating system for paper wherein a substrate, shown as a web of paper 10, is moved past a coating apparatus 12 which applies coating to the underside of the paper web. The coating apparatus 12 comprises a coating pan 14, rotating applicator roll 16, and a doctor apparatus 18 of any suitable variety. A body of coating 19 reposes in the pan and the applicator roll as it rotates picks up the coating and transfers it to the underside of the web. The excess coating is struck off by the doctor apparatus 18 and returns to the body of coating 19 in the pan.

Figure 2:
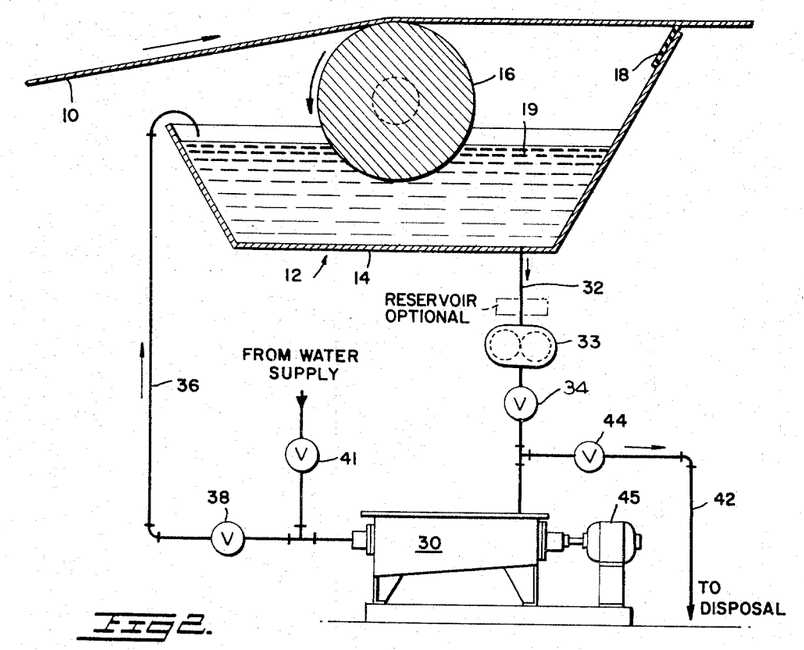
FIG. 2 schematically illustrates a coating system incorporating the present invention.

Referring now to FIG. 2 there is shown schematically a coating system incorporating a screening means according to the present invention. The coating pan, applicator roll, doctor blade, and other parts are for illustrative purposes as before. The system also includes a screening means 30 and suitable inlet and outlet connections between it and the coating pan 14. An inlet conduit 32 is connected between a suitable point in the coating pan and the inlet 130 (see FIG. 6) of the screening means. A reservoir may optionally be provided in conduit 32. A pump 33 is upstream of the manually operated inlet gate valve 34 in the conduit 32. After coating has moved through the inlet conduit (and the pump and valve therein), it passes through the screening means 30 and is returned to the body of coating in the pan 14 through a line 36 which contains therein a manually operated return gate valve 38. It will be appreciated that the pump is shown as a gear pump but could be of any suitable sort.

The system of FIG. 2 also includes a backflush gate valve 41 which is connected between a suitable source of water under pressure and the return line 36 at a point upstream of the valve 38. A conduit 42 leads to a sewer or suitable repository for waste materials and has therein a manually operated disposal gate valve 44 which is connected into the conduit 32 at a point between the inlet valve 34 and the screening means. Also, an electric motor 45 is provided to drive the movable portions of the screen assembly 30.

In normal operation of the system of FIG. 2, valves 34 and 38 are open and valves 41 and 44 are closed.

The valves 41 and 44 comprise a back flushing system to direct wash water through the screening apparatus in a reverse direction whereby dirt and other materials which have collected on the screening element are removed from the screen and a portion of them carried through the line 42 to disposal such as a sewer. During back flushing, valves 34 and 38 are closed, the pump 34 is turned off, and the backflush and disposal valves 41, 44 are open.

Preferably backflushing can also be done by closing valves 34, 38, 44 and opening valve 41 and clean out port 70 (FIG. 3) whereby cleaning water carries screening rejects out through port 70. A conduit or sewer line with a disposal valve therein can be attached to the port 70 for convenience, the valve being operated the same as described above for valve 44 and, of course, in conjunction with backflush valve 41.

Figure 3:
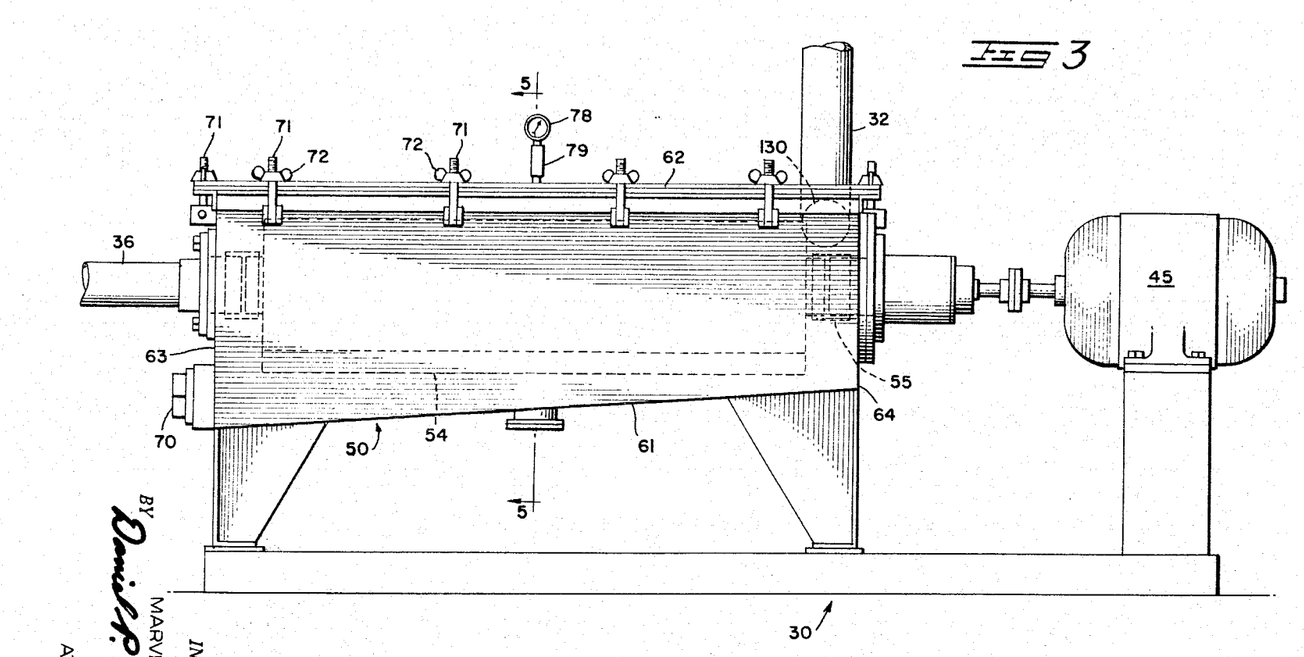
FIG. 3 is a schematic side elevation of apparatus constructed according to the invention, as seen from the outside thereof.
Figure 4:
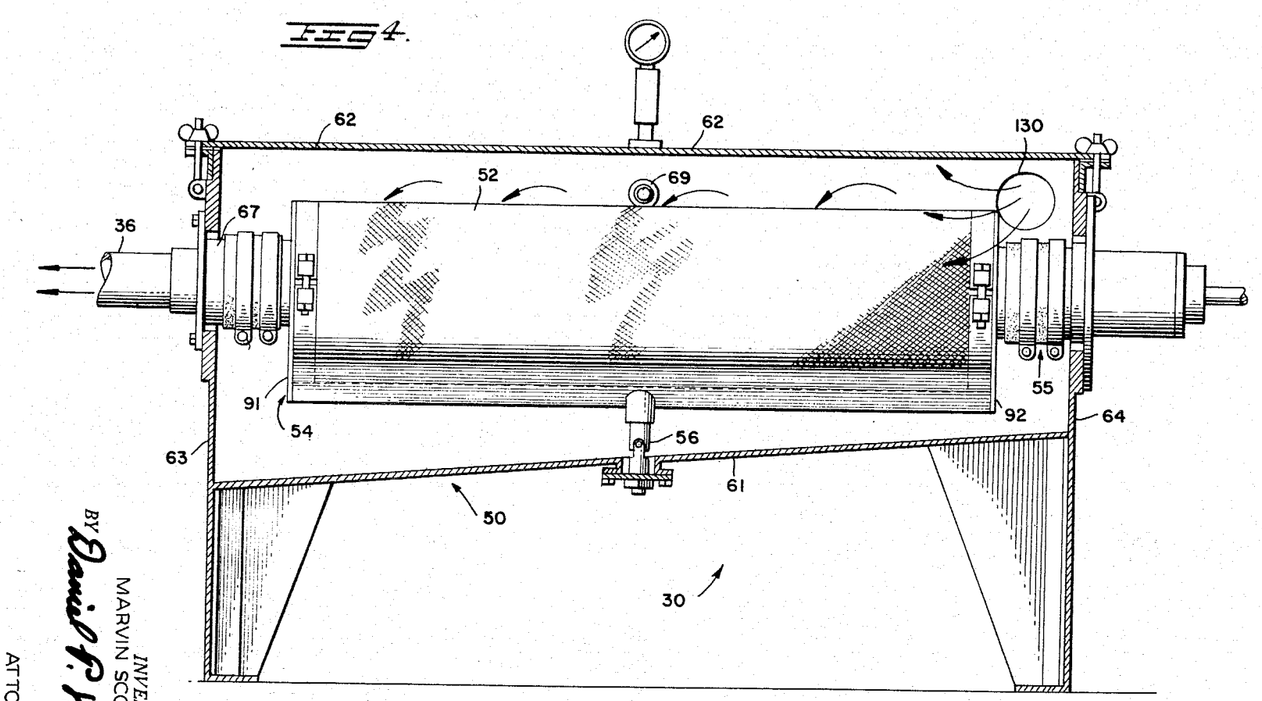
FIG. 4 is an enlarged side elevation of the apparatus of FIG. 3 with a portion of the housing cut away, not drawn to scale, and showing certain features of the present invention such as the general location of main components of the apparatus.
Figure 5:
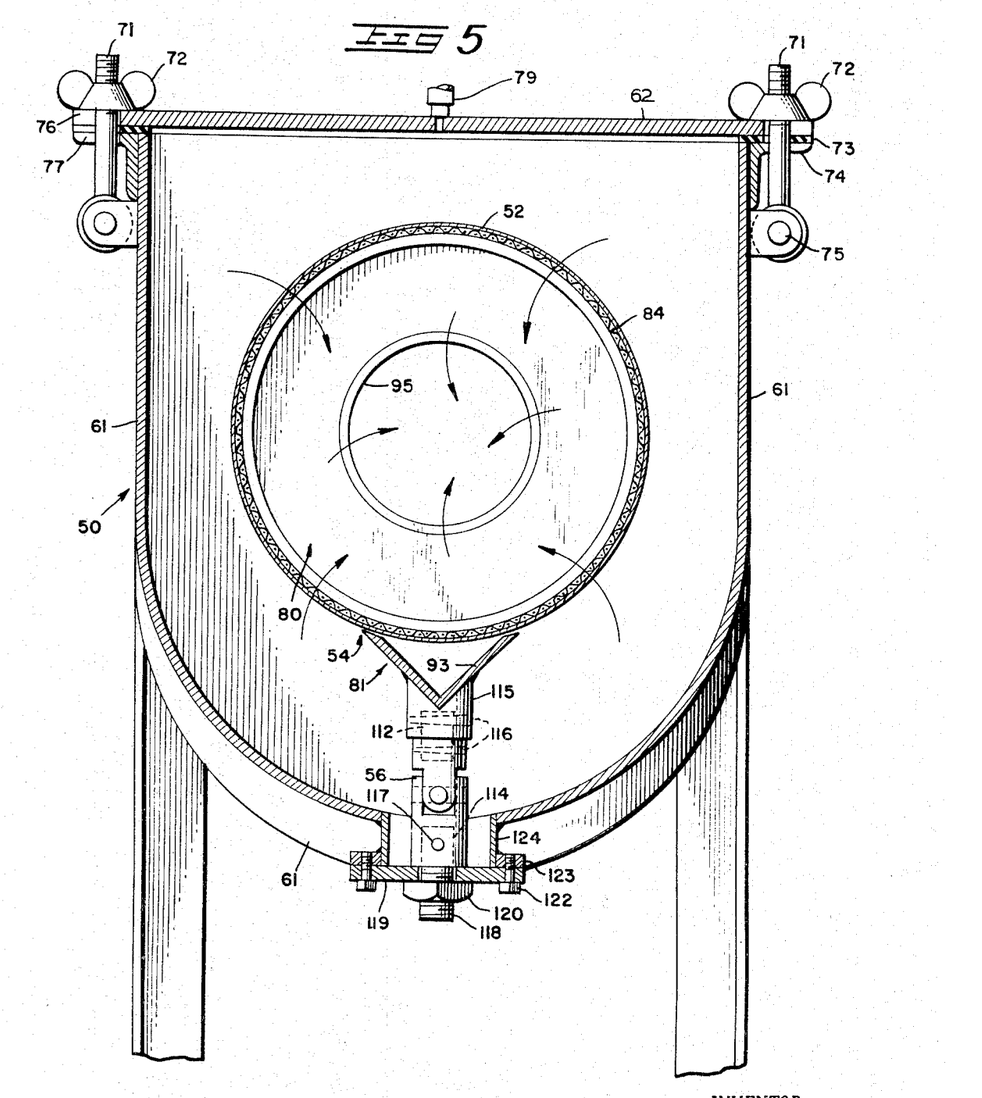
FIG. 5 is an enlarged cross section, not to scale, along section 5—5 of FIG. 3 and illustrating the manner of holding the removable housing sidewall in place and the structural arrangement of the screen and the apparatus supporting same.

FIGS. 3–5 show in assembled form the arrangement of the parts of the screening apparatus 30. These include a housing 50, a screen 52 supported in tubular form by a screen supporting assembly 54 and a power head 55 as components of the apparatus. A universal joint 56 medially supports the tubular screen 52 via connection to the screen supporting 54 and operates in conjunction with the power head 55 to contribute to the orbital motion of the screen support assembly, such motion defining a substantially hourglass-shaped orbit.

The housing 50 comprises a plurality of side walls 61, including a removable top side wall 62, and end walls 63, 64 at opposite ends of the housing assembly. An inlet 130 (connected to inlet conduit 32 of FIG. 2) is at an upper end of one side wall, adjacent that end wall 62 which supports the power head 55. An exit conduit connection 67 for the screened fluid extends inwardly from the opposite end of the housing in end wall 63. The housing thus provides an elongated screening chamber 68 in which is supported the screen 52 and its support assembly 54.

Referring to FIGS. 3, 4 and 5 the removable top side wall 62 is illustrated as a plate 62 held in place by a plurality of hinge bolts 71 and wing nuts 72. The gasket 73 (FIG. 5) of resilient material is placed between the undersurface of the plate 62 and a flange 74 (conveniently made by welding angle iron around the outside of housing side wall) provides a fluid-tight resilient seat. The hinge bolts are mounted on pins 75 to swing in and out of the slits 76, 77 in the plate 62 and flange 74. The system operates under pressure, so a pressure gauge 78 and suitable fittings 79 to mount the gauge in pressure communication with chamber 68 may be provided on the plate 62.

Fitting assemblies for a number of high pressure cleanout port assemblies 69 (FIG. 4 only) may be provided so that high pressure water or other cleaning fluids can be admitted to chamber 68 to wash off the outside of the screen. Fittings providing a large clean-out port assembly 70 (FIG. 3 only) or a hand hole may also be provided at one end of the housing, illustrated here as being in the left hand end wall. Lumps and sediment can be removed via the hand hole manually or during the backflushing operation. Fitting assemblies 69 and 70 may conveniently each be a threaded hole through the housing wall with a pipe plug screwed thereinto for sealing same when not in use. Fitting 69 facilitates chamber drainage during backflushing, if open.

The housing 50, support assembly 54, and fittings are in general constructed of stainless steel or similar non-corrodable material. A welded construction is preferred wherever possible. The apparatus 30 operates under internal superatmospheric pressure during screening operations and is constructed to withstand such pressures.

As best seen in FIGS. 4, 5, 6 and 8 the screen support element 54 includes cylinder sub-assembly 80 which is in turn supported by a cradle sub-assembly 81. The fine screen 52 is preferably of nylon, stainless steel, or the like, is removably supported in tubular form (shown as circular in cross section although other configurations are contemplated e.g., square) on the cylinder 80 by the clamps 82 and is removable therefrom. The cylinder sub-assembly 80 comprises an open mesh (e.g., ¼ to ½-inch mesh) tubular stainless steel screen 84 (illustrated as circular in cross section but other shapes are included) to which is welded support rings 85 at the ends and at any suitable intermediate point. The end supporting rings 85 protrude past the stainless steel screen 84 at the ends where they are received by the fixed clamping ring 87 (which is part of the cradle) and held against the fixed ring 87 by the removable clamping ring 88 by the nuts and bolts 89, 90. The fixed clamping ring 87 is welded to and a part of the cradle sub-assembly.

Figure 8:
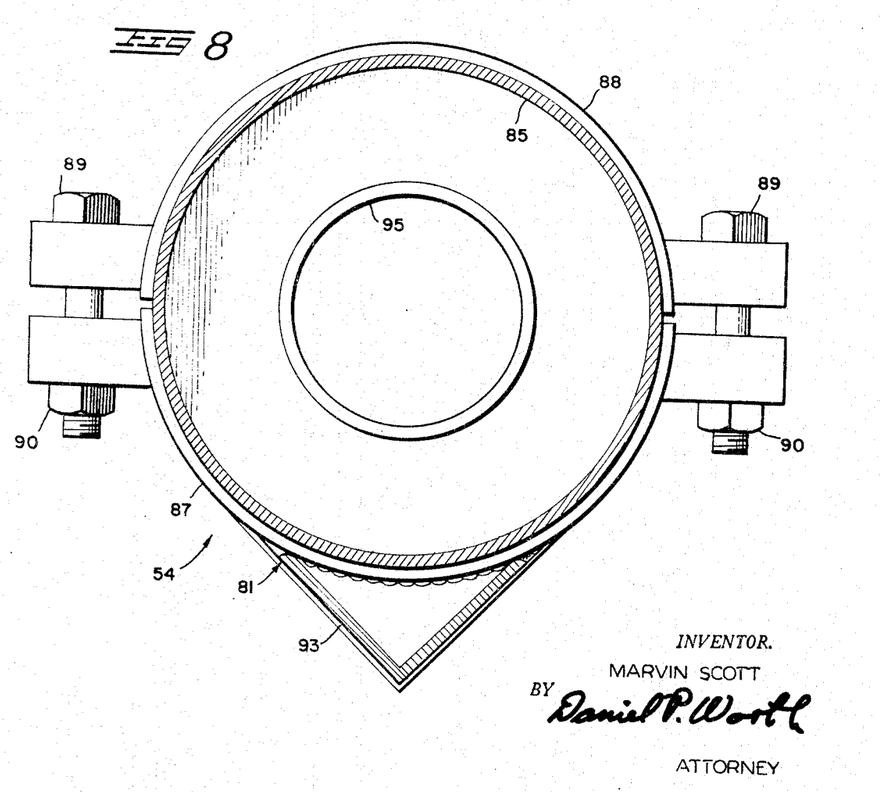
FIG. 8 is an enlarged but not to scale cross section as seen along section 8—8 of FIG. 6 and illustrating certain features of the cradle and cylinder assembly including the fashion in which they are clamped together.

The cradle sub-assembly 81 comprises cradle end plates 91, 92 spaced apart by and secured (as by welding) to a support bar 93 which conveniently may be made of angle iron. The support bar itself has a connection at its midpoint to the universal joint 56. Each cradle end plate has secured (as by welding) on the inside face thereof the lower half 87 of the corresponding clamping ring assembly. The lower clamping rings 87 are arranged to receive in a cradle fashion the support rings 85 of the cylinder.

In the right hand cradle end plate 92 (see FIGS. 4 and 6) is provided structure to receive and support portions of the power head 55. The power head is described below. The left hand end plate 91 of the cradle has outlet conduit 95 extending outwardly (shown as to the left) toward the end wall exit connecting 67 so that fluid may flow therethrough. During continuous operation the fluid will flow out through the connection 95 into the housing end wall connection 67 thence to some designated delivery point. A short section of resilient or flexible conduit 96 such as a nipple or rubber hose 96 provides a flexible conduit connection between the cradle end connector 95 and the housing end wall connector: in effect conduit 96 establishes a flexible closed passage from inside the screen 52 to outside the housing. Pipe clamps 97 or the like are shown as holding the flexible connection 96 in place on each of the end wall and cradle connectors.

Figure 6:
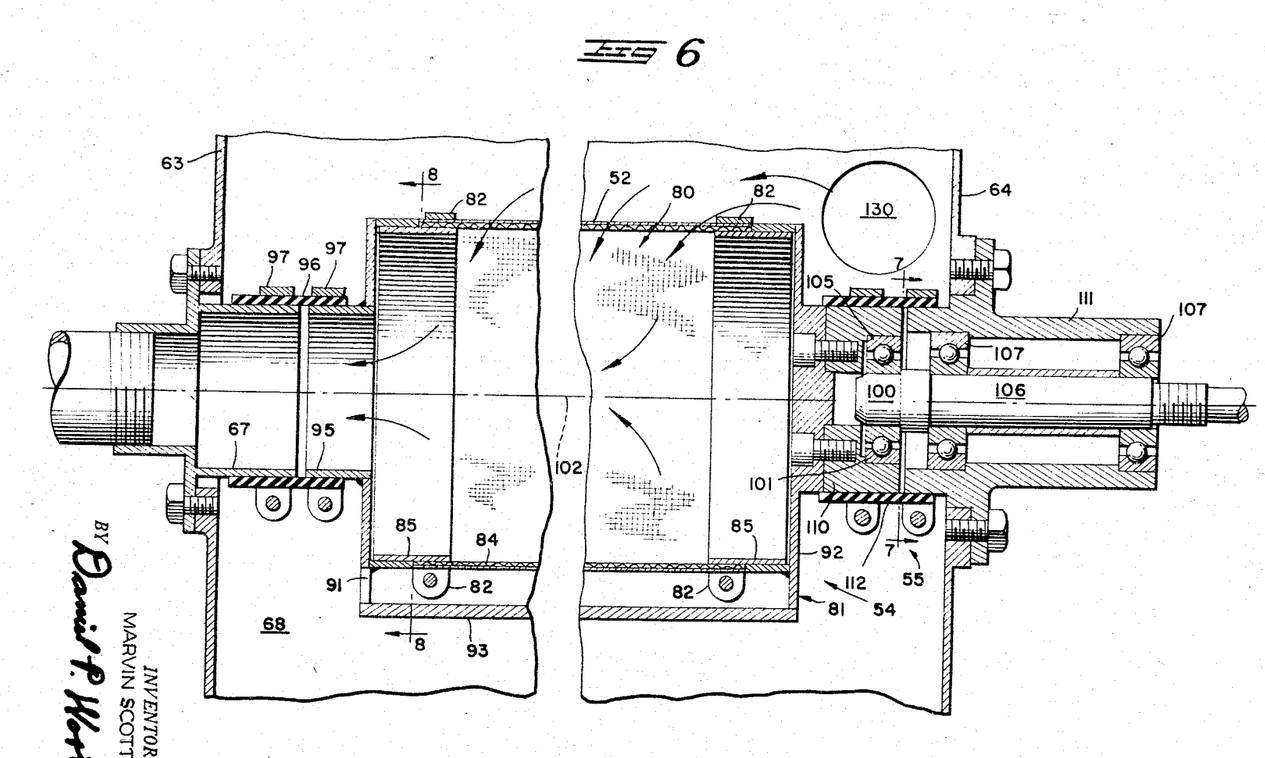
FIG. 6 is an enlarged cross section not to scale of parts of FIG. 3, in side elevation, particularly illustrating the flexible outlet conduit and the powerhead assembly.
Figure 7:
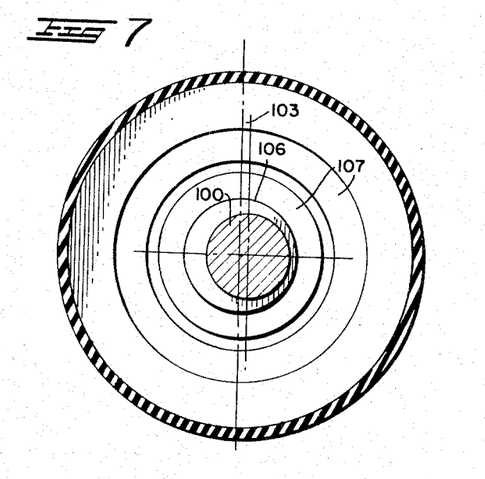
FIG. 7 is an enlarged cross section not to scale of 7—7 of FIG. 6 showing certain details of the powerhead, particularly the eccentric member 100.

As seen in FIGS. 4, 6 and 7 the power head assembly 55 employs a rotatable eccentric element 100 which drives a circular follower and housing 110 mounted on the end plate 92. When the eccentric is rotated (e.g., by motor 45), it causes the entire screen 52 and its support assembly 54 to move in an hourglass-shaped orbit about the longitudinal axis 102: the right end 92 of the support assembly moves through a circular orbit, but the assembly 54 being restrained at its center by the universal joint, a sort of wobble action is achieved at each end of the screen (and its support), called herein a substantially hourglass-shaped orbit.

In the illustrated embodiment, the power head 55 employs a ball bearing assembly 105 between the eccentric and the follower. The eccentric is preferably an off-center cylindrical end of the drive shaft 106. The drive shaft 106 rotates in ball bearings 107. A drive shaft collar (FIG. 6—no number) spaces bearing 105 from adjacent bearing 107 and a sleeve (FIG. 6—no number) spaces the bearings 107. The eccentric 100 is shown as integral with the shaft, and can be off-center by from $\frac{1}{64}''$ to $\frac{3}{8}''$ as measured from the axis of rotation (or center line) 102 of the shaft 106. Eccentricity is designated as 103 in FIG. 7. The electric motor 45 connected through a suitable coupling rotates the shaft 106 wherefor the eccentric drives the screen assembly through the hourglass-shaped orbit.

In FIGS. 6 and 7 the power head housing comprises the follower and housing 110 which is bolted to and protrudes toward the drive shaft from the right cradle end plate 92; an eccentric housing 111 supported from the housing right end wall 64 as shown in FIG. 6, and a resilient sleeve such as rubber nipple 112 is clamped in place to keep liquid out of the power head.

As shown in FIGS. 4 and 5 the screen 52 and screen support 54 assemblies are supported at a central part thereof, that is medially, by a flexible mounting such as a ball and socket joint or preferably the universal joint 56. The universal joint is secured between support bar (angle iron) 93 and the housing through the agency of a stud 112 and a threaded stud 114 located respectively at the upper and lower ends of the universal joint. The upper end of stud 112 extends into a recess in lug 115 which is welded or otherwise secured to the bar 93. Tapered pins 116 are force-fited into the universal joint and the lug to maintain the stud, hence the universal joint, fixed in position at the upper end thereof.

The lower threaded stud 114 is secured by a pin 117 to the lower end of the universal joint. The pin 117 is tapered and force-fitted in the universal joint. The lower end of stud 114 has threads 118 thereon. The threaded end extends through a hole in a blind flange 119 and is secured in place by a nut 120. It will readily be seen that the aforesaid construction provides means to loosen the universal joint in order to assemble or disassemble the apparatus, particularly to remove the screen and screen assembly from within the housing.

The blind flange 119 is secured by any appropriate means such as a plurality of bolts 122 to a corresponding flange 123 which is supported from the housing, as by welding, by a short nipple 124 which is in turn mounted on the housing. It will be observed that the structure shown, as best seen in FIG. 5 provides a recess at the bottom of the housing in which the lower end of the universal joint is received.

In operation, coating material or other liquid to be screened (e.g., 19, FIG. 2) is admitted to the housing 50 through the inlet opening 130 and fills the chamber 68 within the housing and the tubular space within the screen 52 under pressure. The liquid passes through the screen 52 in the course of which lumps are retained on the outside of screen and eventually may fall to the bottom of the chamber. The screened fluid leaves the housing by passing out through the outlet passage that comprises the connections on the screen assembly 95, the resilient connector 96, and the housing outlet connection 67. During all of this time the screen is wobbled or vibrated by means of a motor 45 driving the power head 55. The power head drives one end of the screen unidirectionally and repetitively through a circular path and the other end of the screen moves substantially equally and oppositely. Thus, the screen and its support assembly is centrally supported so that the hourglass shaped orbit is realized through the coaction of the pivot joint or hinge joint assembly 56 and the eccentric motion provided by the power head.

The structure described affords numerous practical advantages: it is readily cleaned by using the fittings 69 to admit water under pressure and the port at 70 to backflush and remove accumulated lumps; the screen 52 can be replaced readily because of access through removable housing wall 62, the removable mounting on the cradle 81 and cylinder 80; various meshes of screens 52 can be used; shafts with various amounts of eccentricity 103 (FIG. 7) can be substituted for each other; the screen can be wobbled at various speeds; small screen area is readily achieved especially on thixotropic liquids; all of which mean that repair and cleaning up are readily achieved and that the apparatus can be modified as to screen mesh, amplitude, wobble (or cycle) speed, and, similarly, as to the process and the system.

The process of this invention to screen lumps from mixtures of liquids and solids (such as coating 19) includes the steps of providing a tubular screening element 52 disposed within the chamber 68 the outlet passage 67 from the chamber extending from internally of the element 52; filling the chamber including the element with the mixture to be screened; moving the element repetitively and unidirectionally through an hourglass-shaped orbit by operating the power head 55; maintaining a superatmospheric pressure in the chamber; and maintaining flow from inlet 65 (e.g., from conduit 32) into the chamber of the mixture to be separated while moving the screening element 52 and removing screened mixture from internally of the element and through the outlet passages 95, 96, and 67.

An example follows in which the screen 52 was 40 mesh nylon screen, of 172 square inches total area, the amount of eccentricity 103 was $\frac{1}{32}$ inch, the frequency of vibration or rotation was 1725 r.p.m., and the coating comprised an aqueous mixture of 8 parts casein and 8 parts latex as adhesive, 100 parts calcium carbonate pigment, (all parts by weight) and had total solids of 54.

The screen was installed as shown in FIG. 2 for continuous screening of the coating being pumped from a reservoir in line 32 to a cast coating application 12. The estimated screening rate at the start of the run was approximately 15 gallons per minute. Just prior to installing the screen, lumps were beginning to show up in the coated paper made on the casting drum; the coating from the pan 14 prior to the test had a 325-mesh rejects test of 0.32%. After the screen had operated for an hour, the pan 325-mesh rejects had dropped from 0.32% to 0.07%.

The 325-mesh rejects test is run as follows: a 1000 gram sample of coating is obtained and screened on a 325-mesh screen. The rejects, i.e., the material retained on (or not passed by) the screen are collected, dried in an oven to a bone dry condition, then weighed. The weighed residue, in grams, is then expressed as a percent (on a weight basis obviously) of the actual total solids in the original wet sample. The system and screen 30 ran continuously for 27 hours and 50 minutes before being backflushed via valves 34, 38, 41, 44. Flushing time required approximately five minutes. Approximately 108 grams of wet rejects had been collected by the screen 52 during this 28-hour period. The screen 30 was put back into operation immediately after flushing. The pan (14, FIG. 2) 325-mesh rejects were still running at a level of approximately 0.06%.

Operation was continued for another 28 hours and 55 minutes when the unit was again backflushed for about five minutes. Approximately 100 grams of wet material were collected by the screen 52 during this second 28-hour period of continuous operation. At 8 a.m. on the fourth day 325-mesh rejects from the color pan were still at a level of 0.07%.

Subsequent continuous tests on the same equipment included backflushing every 2 or 3 days during which the 325-mesh reject levels remained in the vicinity of 0.07% at the coating pan.

I claim:

1. Apparatus for screening liquids, slurries, and various mixtures of liquids and solids comprising:
   a housing having side walls and a pair of opposed end walls defining within the housing an elongated chamber extending lengthwise between said end walls;
   an outlet connection adjacent one end of the housing through one of said end walls;
   an inlet connection through one of the walls of the housing adjacent the other end of the housing;
   an elongated tubular screen supporting member within said elongated chamber, said screen supporting member having adjacent said one end an outlet connection from inside that region surrounded by a screen when a screen is supported on the supporting member;
   a flexible connection and conduit connected between the screen supporting member outlet and the outlet connection on said housing end wall, whereby there is provided as a flow path for material to be screened said inlet connection, said region, and said flexible connection;
   means for moving the ends of said screen supporting member eccentrically in an orbit about the axis thereof; and
   a flexible joint connected between the housing and screen supporting member supporting said screen supporting member medially located between the ends of said member; whereby the conjoint action of the means for moving and the flexible joint moves the support member in an hourglass shaped orbit.

2. Apparatus according to claim 1 further comprising a back flush system to reverse flow through the chamber whereby a liquid may flow from the aforesaid housing outlet connection through the chamber and screen supporting member thence through the housing inlet connection.

3. Apparatus according to claim 1 further comprising a back flush system that includes valving arranged to admit liquid to said housing outlet connection and to shut off exit flow from same.

4. Apparatus according to claim 1 wherein at least a portion of one of the side walls of said housing is substantially removable whereby access for cleaning and maintenance is obtained to the elongated chamber and apparatus therewithin.

5. Apparatus according to claim 1 further comprising a screen removably supported on said tubular screen supporting member.

6. Apparatus for screening liquids, slurries, and various mixtures of liquids and solids comprising:
   a housing capable of operating under internal pressure and having end walls and side walls defining within the housing an elongated chamber;
   an outlet connection through one of the end walls of the housing;
   an inlet connection in one of the side walls of the housing adjacent to the other end wall;
   an elongated tubular screen supporting member within said elongated chamber;
   a screen supported in tubular shape by said member;
   said screen supporting member having at one end an outlet connection from inside the region surrounded by the tubular screen supporting member and a cam follower supported on the opposing end thereof;
   a flexible connection and conduit connected between the screen supporting member outlet and the outlet connection in said housing end wall;
   a universal joint connected between said housing and said screen supporting member supporting said screen supporting member at a central portion thereof; and
   a cam rotatable relative to said housing and mounted to drivingly engage said cam follower.

7. A system for screening coatings and the like comprising:
   means for applying said coatings to a substrate, said means having a reservoir for containing coating materials;
   screening means;
   means to transfer coatings from said reservoir to said screening means;
   means to remove screened coatings from said screening means and return them to said reservoir;
   said screening means further comprising a housing capable of operating under super-atmospheric pressure and completely surrounding the next-claimed screening element;
   a tubular screening element disposed within said housing;
   an outlet from said housing communicating between said means to remove and return and the inside of said tubular screening element;
   means connected between said housing and said screening element for movably supporting said screening element at a medial portion thereof; and
   means for moving the ends of said element through a substantially circular path whereby an hourglass shaped orbit is defined by the element as it moves through its orbit responsive thereto.

8. A screening apparatus comprising in combination a tubular screening member;
   means for flexibly and movably supporting said screening member at central portion thereof;
   means for moving one end of said screening member through a predetermined hourglass-shaped orbit eccentrically about the longitudinal axis threof;
   a housing surrounding said screen, and having an inlet for fluids to be screened through the housing and an outlet through the housing for fluids that have been screened;
   said means for flexibly and movably supporting being connected between said housing and said screening member; and
   conduit means connected betwen said outlet and the inside of said tubular screening member whereby materials may flow into said housing, through said screening member, thence out of said housing through said conduit means.

9. A screening apparatus according to claim 8 wherein said means for flexibly and movably supporting is a universal joint.

10. A screening apparatus according to claim 8 further comprising second means for removably supporting said screening member in tubular shape, and said means for flexibly and movably supporting being connected between said housing and said second means for supporting.

11. A screening apparatus according to claim 8 wherein said conduit means includes a flexible conduit connected between said housing and said tubular screening member.

(References on following page)

References Cited

UNITED STATES PATENTS

| | | | |
|---|---|---|---|
| 559,059 | 4/1896 | Heberer | 210—385 |
| 1,337,170 | 4/1920 | Wachenberg | 210—391 X |
| 2,655,265 | 10/1953 | Little | 210—398 |
| 3,263,815 | 8/1966 | Golucke et al. | 210—384 X |
| 3,292,577 | 12/1966 | Cressey et al. | 118—603 |

FOREIGN PATENTS 465,783   6/1950   Canada.

REUBEN FRIEDMAN, *Primary Examiner.*

J. ADEE, *Assistant Examiner.*

U.S. Cl. X.R.

210—385, 391